(12) United States Patent
Maffeis

(10) Patent No.: US 6,561,056 B2
(45) Date of Patent: May 13, 2003

(54) LINEAR HANDLING UNIT

(75) Inventor: Giuseppe Maffeis, Roncadelle (IT)

(73) Assignee: Gimatic S.P.A. (IT)

( * ) Notice: Subject to any disclaimer, the term of this patent is extended or adjusted under 35 U.S.C. 154(b) by 0 days.

(21) Appl. No.: 09/733,558

(22) Filed: Dec. 8, 2000

(65) Prior Publication Data

US 2001/0014278 A1 Aug. 16, 2001

(30) Foreign Application Priority Data

Feb. 11, 2000 (IT) .......................................... BS00A0008

(51) Int. Cl.⁷ ................................................ B25J 18/00
(52) U.S. Cl. ........................ 74/490.01; 384/43; 384/45; 414/749.1
(58) Field of Search ........................... 414/749.1, 749.6; 74/490.01, 490.09, 102; 384/43, 44, 49, 50, 57, 59, 45; 29/898.03

(56) References Cited

U.S. PATENT DOCUMENTS

| | | | |
|---|---|---|---|
| 3,790,233 A | * 2/1974 | Polidor | 384/10 |
| 4,898,080 A | * 2/1990 | Lieberman | 92/14 |
| 4,923,311 A | * 5/1990 | Gibbs et al. | 384/49 |
| 5,044,780 A | * 9/1991 | Teramachi | 384/44 |
| 5,431,497 A | * 7/1995 | Nonaka | 384/45 |
| 5,649,804 A | * 7/1997 | Schychuck | 414/751 |
| 5,678,663 A | * 10/1997 | Watanabe et al. | 188/67 |
| 5,829,885 A | * 11/1998 | Scheich | 384/45 |
| 5,868,499 A | * 2/1999 | Greubel et al. | 384/15 |
| 6,174,086 B1 | * 1/2001 | Ng et al. | 384/45 |

* cited by examiner

Primary Examiner—Kathy Matecki
Assistant Examiner—Michael Lowe
(74) Attorney, Agent, or Firm—McGlew and Tuttle, P.C.

(57) ABSTRACT

A linear handling unit is provided with a first body (11), which carries opposite linear bearings (16) in the front and a fluid-type linear actuator (19). A second body carries, longitudinally, two lateral studs (29) for guiding and for coupling with the linear bearings for the movements of one body on the other. The linear actuator is connected to the second body. The studs (29) are arranged in two parallel, flexible-expandable flanges (26) integral with the second body carrying the studs. An adjusting bar (31) is arranged between the studs.

15 Claims, 5 Drawing Sheets

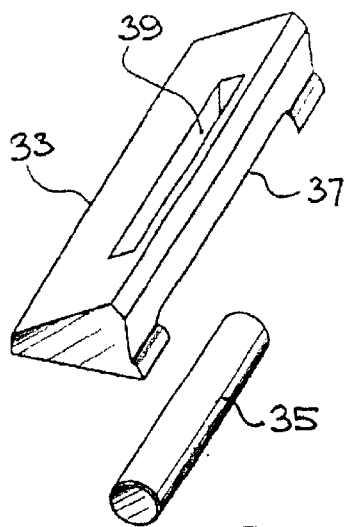
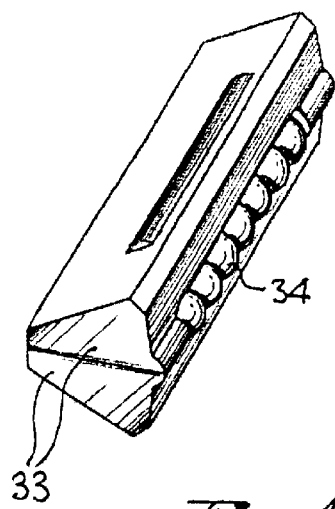
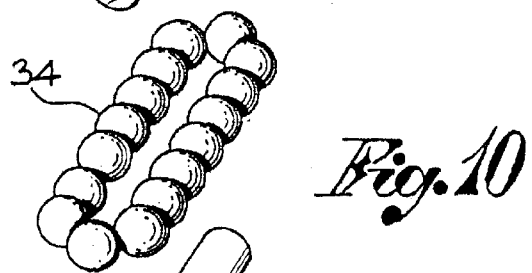
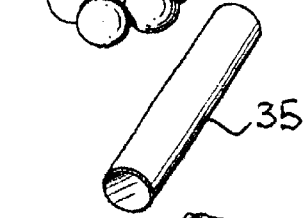
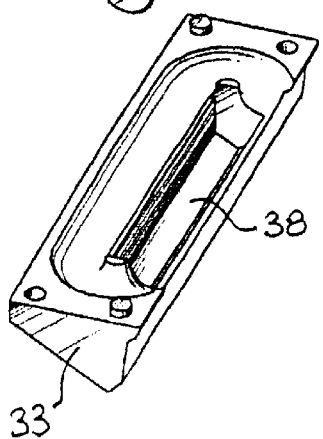
Fig. 10
Fig. 11

LINEAR HANDLING UNIT

FIELD OF THE INVENTION

The present invention pertains to a linear handling unit of the type comprising a fixed body, a movable body that is driven and is alternately movable on the fixed body with the interposition of bearings, at least one linear fluid-type actuator to control the alternate movements of the movable body on the fixed body, and a gripping tool applied to an end interface of the movable body.

BACKGROUND OF THE INVENTION

Linear handling units of the above-mentioned type have already become known. These units include the type comprising, e.g., as was found in a previous patent of the same applicant, profiled elements which are extruded, light and are easily assembled with the features of being compact, reliable and usable with either a horizontal or a vertical arrangement and combined for setting up units of various configurations and performances.

SUMMARY AND OBJECTS OF THE INVENTION

The present invention is aimed at providing a novel, original linear movement unit which is improved in terms of the joining of its components, the guiding and sliding of the movable body with respect to the fixed body and positioning and/or correcting and recovering the clearances.

The present invention is also aimed at proposing to provide linear recirculating ball bearings having a novel configuration, which can be used not only and advantageously in the linear handling units, but also in other equipment.

These objectives of the present invention and evident advantages which derive therefrom are accomplished with a linear handling unit that comprises a fixed body and a movable body which are complementary and superimposed, where one of the bodies carries opposing linear bearings in the front and a motor apparatus, and the other body carries, longitudinally, two lateral studs for guiding and coupling with said linear bearings, and where said studs are in flexible-expandable flanges with an adjusting bar placed therebetween and engaged by means of setscrews to vary the expansion of said flanges and to regulate the clearance between both studs at the same time and the respective bearings.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIG. 10 is an exploded view of the components of a linear bearing;

FIG. 11 is a perspective view of the assembled linear bearing; and

DESCRIPTION OF THE PREFERRED EMBODIMENT

Figure 1:
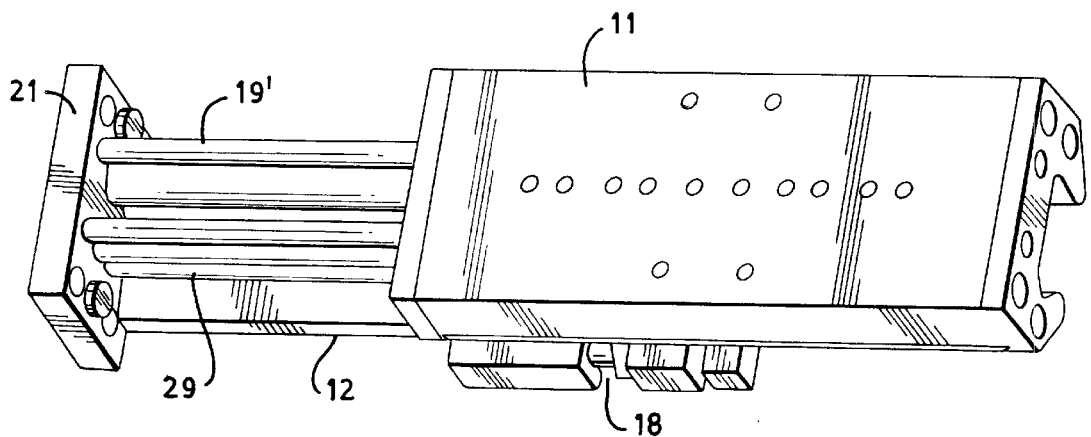
FIG. 1 is a perspective view of the linear unit according to the present invention.

Referring to the drawings in particular, the handling unit shown comprises two complementary, superimposed bodies 11, 12, one fixed and the other alternately sliding on the fixed one. For reference, the body 11 is considered to be fixed here and the body 12 movable, even though the opposite is possible, and the same objects are accomplished at any rate.

The two fixed 11 and movable 12 bodies can be obtained from extruded, profiled elements, made of metal, such as aluminum or its alloys and/or advantageously made of a plastic material.

The fixed body 11 has a basically U-shaped section with a base 13 and two lateral walls 14, which are perpendicular to the base, are parallel and delimit between them a channel 15, in which is arranged the movable body for its linear movements.

The fixed body 11 carries, in the base 13, a motor apparatus for controlling the movable body 12 and on the internal side of each lateral wall 14 a system of linear bearings 16 extending along the fixed body and intended to support and guide the movable body.

A longitudinal groove 17 for the mounting of accessories, such as a limit stop 18, sensors or another device, is provided on the external side of each lateral wall.

In the example illustrated, the motor apparatus comprises two fluid-type, parallel pistons 19 which are housed and slide in cylindrical chambers 20 provided symmetrically in the base 13 of the fixed body. The pistons 19 have a dual purpose and have their rods 19' fixed to an interface plate 21 applied to one end of the movable body 12. For alternate movements of the body 12, the chambers are fed alternately, from opposite parts of each piston, with a pressurized fluid that is carried there by means of feeding means 22 to be connected to fluid pipes and through holes 23 suitably provided in the base.

The linear bearings 16 are arranged and held in seats 24 provided on the internal side of each lateral wall 14 of the fixed body 11, said bearings being arranged in pairs and being able preferably, but not exclusively, to be ball recirculation bearings and of the type described above.

The movable body 12 has a corresponding base 25, which is placed in a position of at least partial superimposition with the lateral walls 14 of the fixed body 11, and from which project two parallel flanges 26, which extend into the channel 15 between said lateral walls 14 or between the linear bearings 16 in the walls. The two parallel flanges 26 are longitudinally separated by a groove 27 having inclined sides 27', which converge in the direction of the free end of the flanges proper. Moreover, each of these flanges is joined to the base 25 of the movable body 12 by means of a tapered part 26' so as to be provided with a relative flexibility.

Longitudinally, the external side of each flange 26 has a semicylindrical slot 28, in which is arranged a cylindrical stud, which rests on the linear bearings 16 contiguous thereto. The studs 29 are made of a suitable material, such as treated steel, and constitute guiding means for the sliding of the movable body 12 on the bearings and in relation to the fixed body 11.

On the bottom of the semicylindrical slot 28 is provided a weakening indentation 30 in order to make the two opposite parts of the flange that delimit the indentation flexible, so that these parts are able to receive and hold the respective stud 29 like pliers.

In the groove 27 between the two flexible flanges 26 of the body 12 is inserted an adjusting bar 31 that rests on the inclined sides 26' of the groove proper. The adjusting screws 32, which rest on the adjusting bar, are screwed from the outside into the base 25 of the body 12 at right angles. The adjusting screws 32 are spaced apart along the bar 31, and these, screwed down properly, make it possible to support, correct and recover clearances between the studs 29 and the sliding linear bearings 16 when assembling the unit and then at any time as a result of the wear caused by the operation of the coupled parts. By actually acting on the adjusting screws 32, the adjusting bar 31 interacts with the inclined sides 26' of the flexible flanges 26, thus expanding same variably in order to adjust, if necessary, the clearances between studs and linear bearings.

Figure 12:
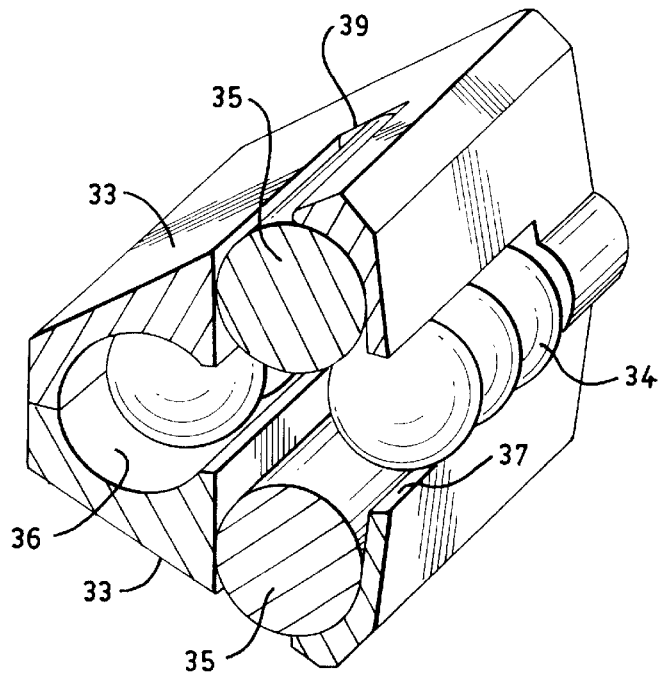
FIG. 12 is a partially sectional perspective view of the bearing of FIG. 11.
Figure 2:
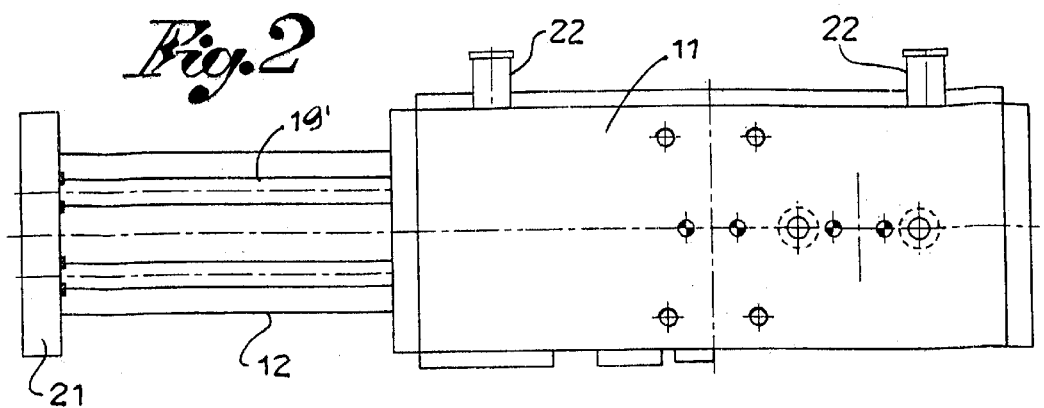
FIG. 2 is a plane view of the unit of FIG. 1, from the base of the body considered to be fixed here.
Figure 3:
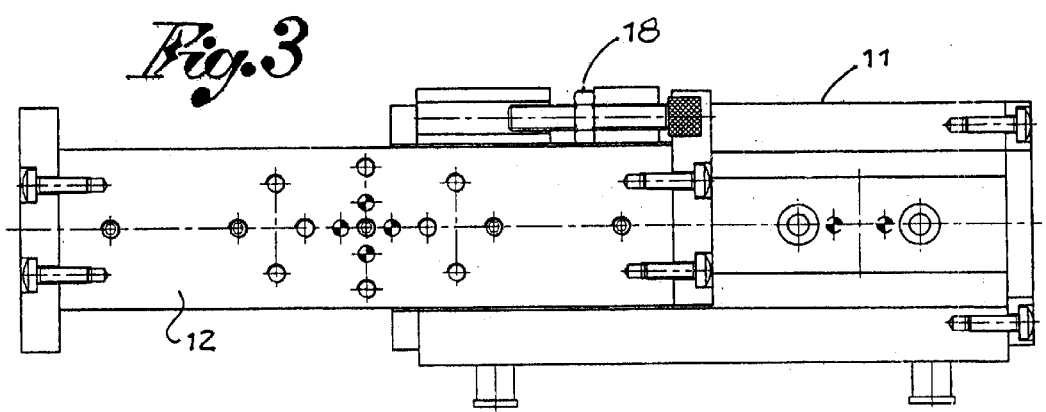
FIG. 3 shows a plane view of the unit of FIG. 1, from the base of the body considered to be movable here.
Figure 4:
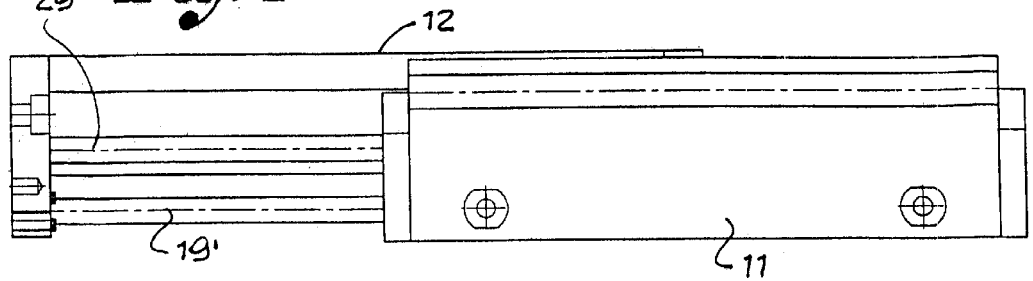
FIG. 4 is a side view of the unit of FIG. 1.
Figure 5:
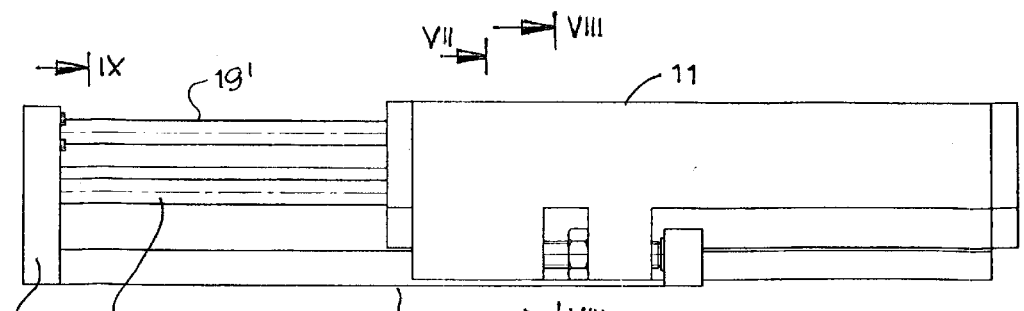
FIG. 5 is a side view of the unit of FIG. 1, the side opposite the side shown in FIG. 1.
Figure 6:
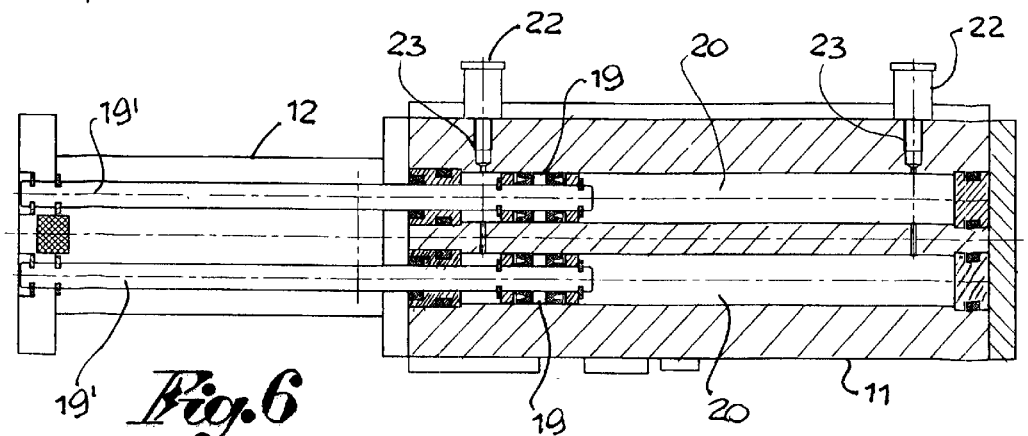
FIG. 6 is a longitudinal sectional view of the unit at the level of the actuator apparatus.

These bearings (FIGS. 10–12) may be, as stated above, of the ball recirculation type. In a preferred and particularly original embodiment, each bearing 16 consists of two shells 33, which are complementary, opposite and closed one on the other, a series of balls 34, and two cylindrical pins 35. The two shells 33 can be obtained from plastic material molding, therefore without mechanical machining, and treated on the surface (heat-treated) in their parts which are intended to receive the balls 34 and pins 35. The balls and the pins are made of steel. The two shells, when assembled, form a bearing body having a trapezoidal cross section (FIG. 12) and together delimit an endless track 36 for housing and recirculating the balls 34. The track 36 has two parallel branches which are connected by semicircular end sections. The branch of the track 36 on the larger part of the base of the bearing body formed by the assembled shells 33 is open towards the outside through a slot 37 and the balls, which pass through that branch from time to time, protrude from the body in order to come into contact with the element to be supported, in the case being discussed with a respective stud 29.

Each shell 33 has a seat 38 for a cylindrical pin 35. The seats for the pins are open towards the outside of the bearing body through an oblong opening 39 in each sloped side of the trapezoidal section of the body proper. The pins 35 are arranged in a plane at right angles to the plane in which the balls 34 lie, and both are arranged so as to rest on the balls that pass through the branch of the track, which is open towards the outside of the body, and to protrude slightly from the body through the openings 39 corresponding to them.

Thus and advantageously, when the bearings are working, their body acts only as a container for balls and pins and is not weighed upon by significant loads. In fact, the loads are then supported by the balls in contact with the element to be supported and to be guided and by the pins which rest, on the one hand, on the balls and, on the other hand, on the walls of the seat in which the bearing is arranged. In other words, the loads acting on the balls are transferred to the pins at right angles and from these to the support walls in the seat for the bearing.

Figure 9:
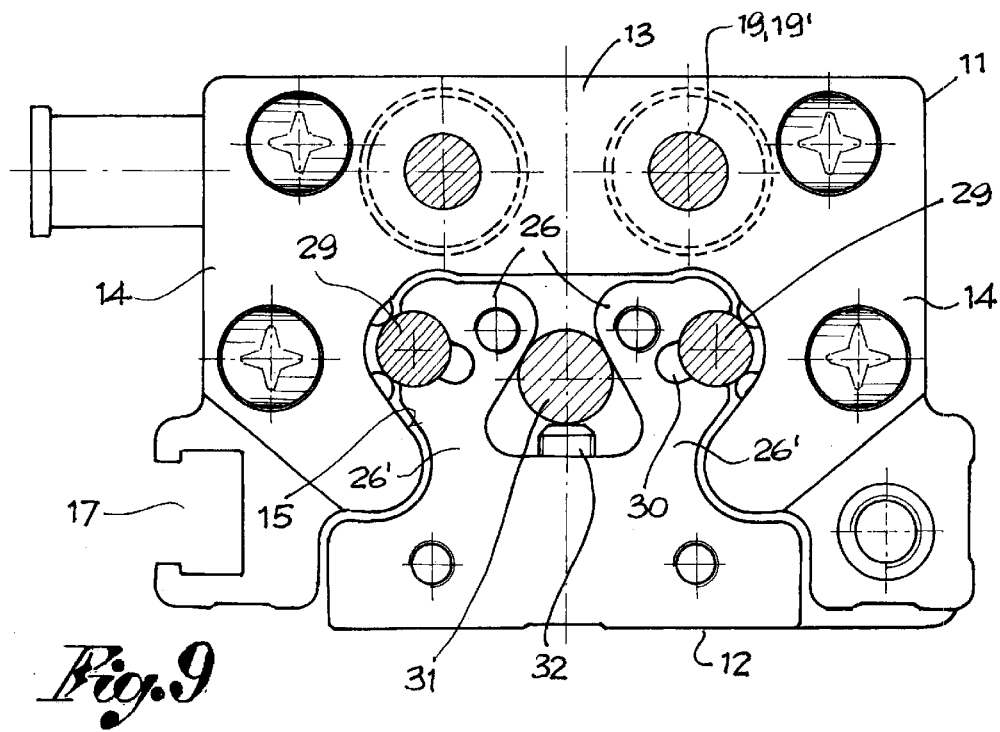
FIG. 9 is a cross sectional view according to arrow IX—IX of FIG. 5.
Figure 8:
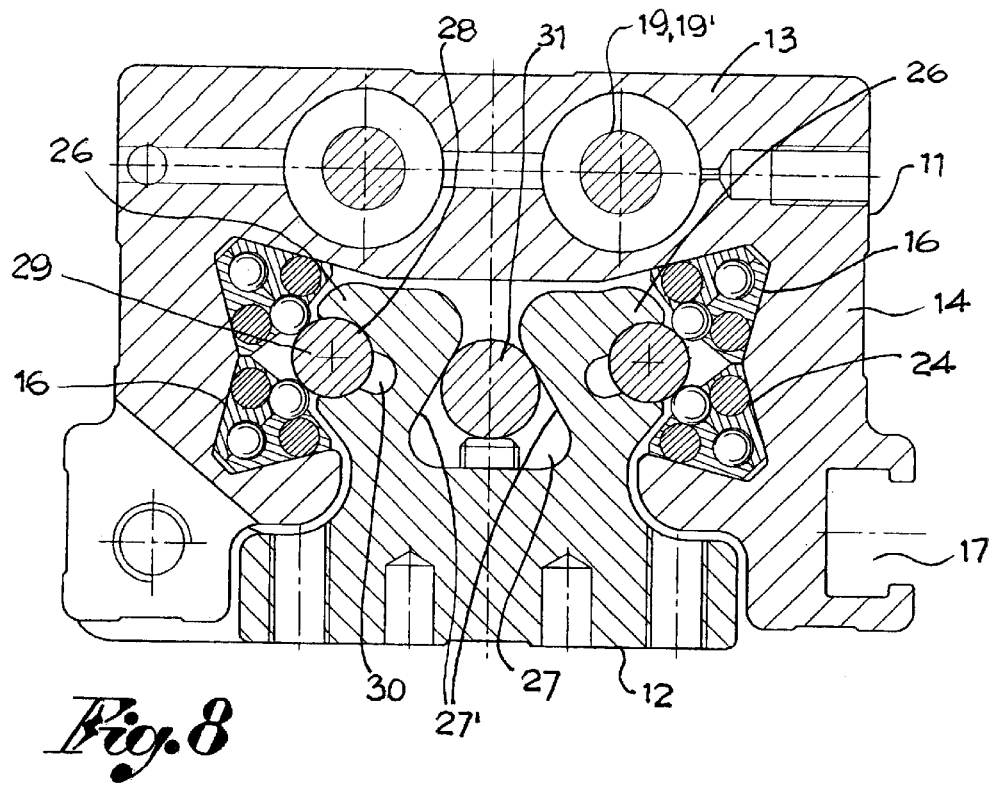
FIG. 8 is a cross sectional view of the unit according to the arrow VIII—VIII, of FIG. 5.
Figure 7:
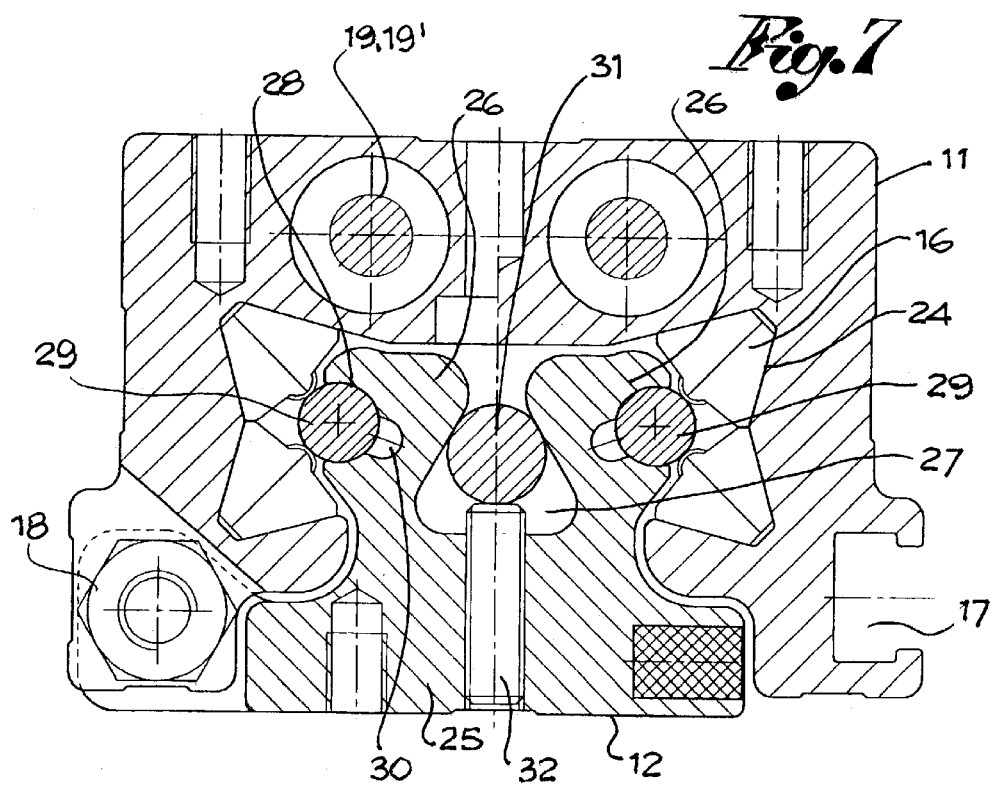
FIG. 7 is a cross sectional view of the unit according to the arrow VII—VII of FIG. 5.

Moreover, the trapezoid-shaped bearings can be used in pairs, resting, one on top of another, on a sloped side of the section as shown in FIGS. 7–9, advantageously making adjustments easier for the recovery of the clearances between the bearings and the guided element.

While specific embodiments of the invention have been shown and described in detail to illustrate the application of the principles of the invention, it will be understood that the invention may be embodied otherwise without departing from such principles.

What is claimed is:

1. A linear handling unit comprising:
   fixed body;
   a movable body;
   bearings, sad movable body being driven and movable on said fixed body with the interposition of sad bearings;
   a fluid-type linear actuator for controlling the movements of said movable body on said fixed body;
   an interface plate at one end of said movable body, one of said fixed body and said movables body being a first body carrying said bearings as opposing linear bearings in a front and carrying said fluid-type linear actuator, the other one of said fixed body and said movable body being a second body longitudinally carrying two lateral studs for guiding and for coupling with said linear bearings for the movement of one said body on the other, said linear actuator being connected to said second body, said studs being arranged in two parallel flexible-expandable flanges which are integral with said second body carrying said studs;
   an adjusting screw; and
   an adjusting bar arranged between said flexible-expandable flanges, said adjusting bar being engaged by said adjusting screw to vary an expansion of said flanges and to regulate the clearance between both said guiding studs and respective said bearings;
   said first body has a U-shaped section with a base, in which is provided at least one chamber for said fluid-type linear actuator, and with two lateral walls that are at right angles to said base and delimit between them a channel, sad second body being arranged and sliding with the interposition of said linear bearings, said linear bearings being ball-recirculation bearings arranged in pairs in seats provided on an internal side of each of lateral walls of said first body;
   each of said ball-recirculation-type linear bearings comprise:
      a shell body formed by two shells, each shell being complementary, opposite and closed one on the other;
      a series of balls arranged to circulate in an endless track delimited by said shells when closed; and
      two pins on opposite parts of said balls in a plane at right angles to a plane in which said balls lie, a branch of said endless track being open towards the outside through a slot so that sad balls, which pass through said branch, protrude to an outside of said shell body by said slot, said pins testing both on said balls that pass through said branch of said track that is open towards the outside and protruding from the shell body each through and oblong opening.

2. A linear handling unit in accordance with claim 1, wherein said fixed body and said movable body are obtained from extruded, profiled elements which are made of aluminum or aluminum alloys or made of plastic material, and said studs are made of treated steel.

3. A linear handling unit in accordance with claim 1, wherein a plurality of adjusting screws are provided and said second body has a base, which is superimposed at least partially on said lateral walls of said first body and from which said flexible-expandable flanges, carrying said guiding studs, project at right angles, said flexible-expandable flanges being separated by a groove having sloped sides, which converge towards a free end of said flexible-expandable flanges, said adjusting bar resting on and interacting with said sloped sides of said groove, said adjusting screws being screwed in at light angles and spaced apart in said base of said second body.

4. A linear handling unit in accordance with claim 3, wherein each said flexible-expandable flange is joined to said base of said second body by a weakened bending part.

5. A linear handling unit in accordance with the claim 4, wherein each said flexible-expandable flange has, on its side turned towards said bearings, a semicylindrical slot with a weakening and elasticizing bottom indentation, each said guiding stud being arranged and held in said semicylindrical slot of said respective flange.

6. A linear handling unit in accordance with the claim 3, wherein each said flexible-expandable flange has, on its side turned towards said bearings, a semicylindrical slot with a weakening and elasticizing bottom indentation, each said guiding stud being arranged and held in said semicylindrical slot of said respective flange.

7. A linear handling unit in accordance with claim 1, wherein said body comprises two said shells having a trapezoidal cross section, said balls protruding from a larger base and said pins protruding from two sloped sides of the trapezoidal section.

8. A linear handling unit comprising:

a fixed body;

a movable body;

bearings, said movable body being driven and movable on said fixed body with the interposition of said bearings;

a fluid-type linear actuator for controlling the movements of said movable body on said fixed body;

an interface plate at one end of said movable body, one of said fixed body and said movable body being a first body carrying said bearings as opposing linear bearings in a front and carrying said fluid-type linear actuator, the other one of said fixed body and said movable body being a second body longitudinally carrying two lateral studs for guiding and for coupling with said linear bearings for the movement of one said body on the other, said linear actuator being connected to said second body, said studs being arranged in two parallel flexible-expandable flanges which are integral with said second body carrying said studs, sad second body being arranged and sliding with the interposition of said linear bearings, said linear bearings being ball-recirculation bearings arranged in pairs in seats provided on an internal side of each of lateral walls of said first body;

adjusting screws;

an adjusting bar arranged between s aid flexible-expandable flanges, said adjusting bar being engaged by said adjusting screws to vary an expansion of said flanges and to regulate the clearance between both said guiding studs and respective said bearings, said linear bearings comprising plural autonomous bearing, modules with each module including a shell body formed by two shells, each shell being complementary, opposite and closed one on the other, a series of ball s arranged to circulate in an endless track deleted by said shells when closed and two pins on opposite parts of said balls in a plane at right angles to a plane in which said balls lie, a branch of said endless track being open towards the outside through a slot so that saving balls, which pass through said branch, protrude to an outside of said shell body by said slot, said pins resting both on said balls that pass through said branch of said track that is open towards the outside and protruding from the shell body each through an oblong opening.

9. A linear handling unit in accordance with claim 8, wherein said first body has a U-shaped section with a base, in which is provided at least one chamber for said fluid-type linear actuator, and with two lateral walls that are at right angles to said base and delimit between them a channel said second body being arranged and sliding with the interposition of said linear bearings, said linear bearings being ball-recirculation bearings arranged in pairs in seats provided on an internal side of each of lateral walls of said first body.

10. A linear handling unit in accordance with claim 9, wherein said second body has a base, which is superimposed at least partially on said lateral walls of said first body and from which said flexible-expandable flanges, carrying said guiding studs, project at right angles, said flexible-expandable flanges being separated by a groove having sloped sides, which converge towards a free end of said flexible-expandable flanges, said adjusting bar resting on and interacting with said sloped sides of said groove, said adjusting screws being screwed in at right angles and spaced apart in said base of said second body.

11. A linear handling unit in accordance with claim 10, wherein each said flexible-expandable flange is joined to said base of said second body by a weakened bending part.

12. A linear handling unit in accordance with the claim 11, wherein each said flexible-expandable flange has, on its side turned towards said bearings, a semicylindrical slot with a weakening and elasticizing bottom indentation, each said guiding stud being arranged and held in said semicylindrical slot of said respective flange.

13. A linear handling unit in accordance with the claim 10, wherein each said flexible-expandable flange has, on its side turned towards said bearings, a semicylindrical slot with a weakening and elasticizing bottom indentation, each said guiding stud being arranged and held in said semicylindrical slot of said respective flange.

14. A linear handling unit comprising:

a fixed body;

a movable body;

bearings, said movable body being driven and movable on said fixed body with the interposition of said bearings;

a fluid-type linear actuator for controlling the movements of said movable body on said fixed body;

an interface plate at one end of said movable body, said fixed body carrying said bearings as opposing linear bearings in a front and carrying said fluid-type linear actuator, said movable body carrying two lateral studs for guiding and for coupling with said linear bearings for the movement of said movable body relative to said fixed body, said linear actuator being connected to said movable body, said studs being arranged in two parallel flexible-expandable flanges that are integral with said movable body, said flanges defining a groove;

an adjusting screw connected to said movable body and having a region of action in said groove; and an adjusting bar arranged between said flexible-expandable flanges in said groove, said flexible-expandable flanges having sloped sides which converge towards a free end of said flexible-expandable flanges, said adjusting bar resting on and interacting with said sloped sides of said groove, said flexible-expandable flanges being engaged by said adjusting screw to press on said sloped sides of said flexible-expandable flanges to vary a displace between said flexible-expandable flanges to vary an expansion of said flexible-expandable flanges and to regulate a clearance between both said guiding studs and respective said bearings;

said fixed body has a U-shaped section with a base, in which is provided at least one chamber for said fluid-type linear actuator, and with two lateral walls are at right angles to said base and delimit between them a channel, said movable body being arranged and sliding in said channel with the interposition of said linear begs, said linear bus being ball-recirculation bearings arranged in pairs in seats provided on an internal side of each of lateral walls of said first body;

each of aid ball-recirculation-type linear bearings comprise:
- a shell body formed by two shells, each shell being complementary, opposite and closed one on the other;
- a series of balls arranged to circulate in an endless track delimited by said shells when closed; and two pins on opposite parts of said balls in a plane at right angles to a plane in which said balls lie, a branch of said endless track being open towards the outside through a slot so that said balls, which pass through said branch, protrude to an outside of said shell body by said slot, said pins resting both on said balls that pass through said branch of said track that is open towards the outside and protruding from the shell body each through an oblong opening.

15. A linear handling unit in accordance with claim 14, wherein said body comprises two said shell having a trapezoidal cross section, said balls protruding from a larger base and pins protruding from two sloped sides of the trapezoidal section.

* * * * *